(12) United States Patent
Zhu et al.

(10) Patent No.: US 10,599,731 B2
(45) Date of Patent: Mar. 24, 2020

(54) METHOD AND SYSTEM OF DETERMINING CATEGORIES ASSOCIATED WITH KEYWORDS USING A TRAINED MODEL

(71) Applicant: Baidu USA LLC, Sunnyvale, CA (US)

(72) Inventors: Yu Zhu, San Jose, CA (US); Lin Li, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 456 days.

(21) Appl. No.: 15/139,254

(22) Filed: Apr. 26, 2016

(65) Prior Publication Data

US 2017/0308613 A1 Oct. 26, 2017

(51) Int. Cl.
  *G06F 7/00* (2006.01)
  *G06F 17/30* (2006.01)
  *G06F 16/9535* (2019.01)
  *G06N 20/00* (2019.01)
  *G06F 16/28* (2019.01)

(52) U.S. Cl.
  CPC ........ *G06F 16/9535* (2019.01); *G06F 16/285* (2019.01); *G06N 20/00* (2019.01)

(58) Field of Classification Search
  CPC ......... G06F 17/30867; G06F 17/30598; G06F 16/285; G06F 16/9535; G06N 99/005
  See application file for complete search history.

(56) References Cited

U.S. PATENT DOCUMENTS

| | | | | |
|---|---|---|---|---|
| 2003/0236659 | A1* | 12/2003 | Castellanos | G06F 17/271 704/4 |
| 2005/0065955 | A1* | 3/2005 | Babikov | G06F 16/951 |
| 2009/0172730 | A1* | 7/2009 | Schiff | G06Q 30/02 725/34 |
| 2010/0271905 | A1* | 10/2010 | Khan | G10L 25/48 367/124 |
| 2011/0078191 | A1* | 3/2011 | Ragnet | G06K 9/00879 707/780 |
| 2011/0154216 | A1* | 6/2011 | Aritsuka | G06F 9/451 715/745 |
| 2011/0208521 | A1* | 8/2011 | McClain | G10L 15/142 704/233 |
| 2012/0059708 | A1* | 3/2012 | Galas | G06Q 30/0244 705/14.43 |
| 2012/0303558 | A1* | 11/2012 | Jaiswal | G06N 20/00 706/12 |
| 2013/0138636 | A1* | 5/2013 | Jin | G06F 17/30244 707/723 |

(Continued)

*Primary Examiner* — Hasanul Mobin
(74) *Attorney, Agent, or Firm* — Womble Bond Dickinson (US) LLP

(57) ABSTRACT

Described is a technique for associating words used in a search query with categories. This technique aims to produce potentially more relevant search results by improving the associations with words used for a search. A machine learning technique is implemented to train a classification model, which may include a word embedding model. The classification model is trained to receive words as input and to create vectors of the words as output. These word vectors may then be mapped to a vector space and the technique may then perform a cluster analysis of the vectors. Based on the cluster analysis, clusters may be identified and each cluster may be associated with a corresponding category.

18 Claims, 9 Drawing Sheets

(56) References Cited

U.S. PATENT DOCUMENTS

| | | | |
|---|---|---|---|
| 2014/0129536 A1* | 5/2014 | Anand | G06Q 10/0635 |
| | | | 707/706 |
| 2014/0156567 A1* | 6/2014 | Scholtes | G06N 5/02 |
| | | | 706/12 |
| 2015/0065803 A1* | 3/2015 | Douglas | A61B 1/00009 |
| | | | 600/200 |
| 2016/0239559 A1* | 8/2016 | Morimoto | G06F 17/30705 |
| 2017/0052946 A1* | 2/2017 | Gu | G06F 17/279 |
| 2017/0286914 A1* | 10/2017 | Fang | G06N 20/00 |
| 2017/0300828 A1* | 10/2017 | Feng | G06N 99/005 |
| 2017/0300862 A1* | 10/2017 | Bhadouria | G06N 20/00 |

* cited by examiner

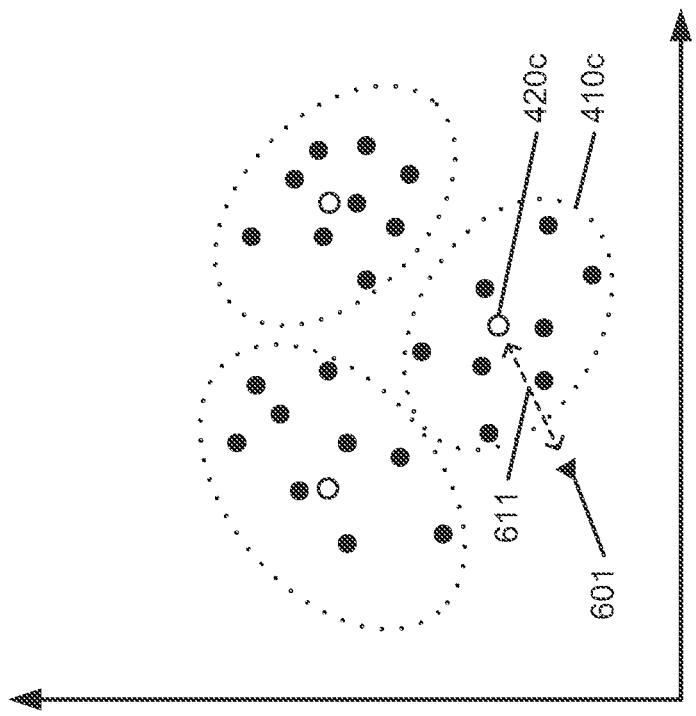
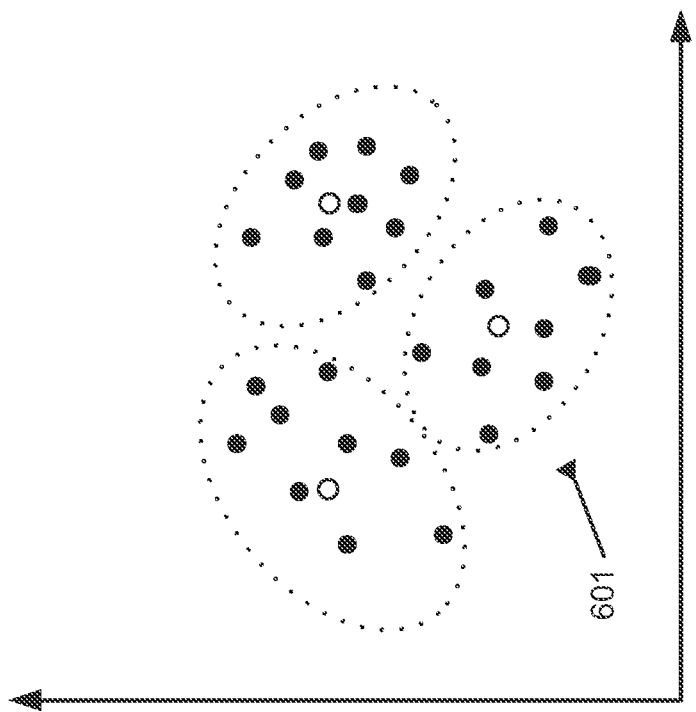

METHOD AND SYSTEM OF DETERMINING CATEGORIES ASSOCIATED WITH KEYWORDS USING A TRAINED MODEL

FIELD OF THE INVENTION

Embodiments of the present disclosure relate to searching keywords. More particularly, embodiments relate to categorizing search keywords using a trained model.

BACKGROUND

In an online environment, search providers often enable a content provider to provide certain words or terms in order to display search results related to the content provider. This allows content providers to tailor a content plan for users that are actually interested or likely to be in interested in the content from the content provider. While this form of content searching has become prevalent, it still remains difficult for a content provider to set up an online content plan. For example, selecting appropriate terms and budgeting can be a complicated and a time consuming process. Moreover, once a plan has been created, a content provider must invest a considerable amount of time determining which words are the most effective and replacing low performing words with new terms.

In other words, much of the effectiveness of the above described method relies on the content provider selecting the most appropriate terms. For example, if a content provider has multiple units, a specific plan must be developed for each unit. Content providers, however, often do not have the resources to devise such a specific plan for each unit. Accordingly, terms are often chosen to apply to a broad range of units. As a result, relying exclusively on the terms selected by a content provider may not always produce the most relevant search results.

BRIEF DESCRIPTION OF THE DRAWINGS

Embodiments of the disclosure are illustrated by way of example and not limitation in the figures of the accompanying drawings in which like references indicate similar elements.

FIG. 6A is a diagram illustrating an example mapping of a keyword vector amongst word vectors of the classification model according to an embodiment of the disclosure.

FIG. 6B is a diagram illustrating an example of determining a nearest cluster to the mapped keyword vector as shown in FIG. 6A according to an embodiment of the disclosure.

DETAILED DESCRIPTION

Figure 1:
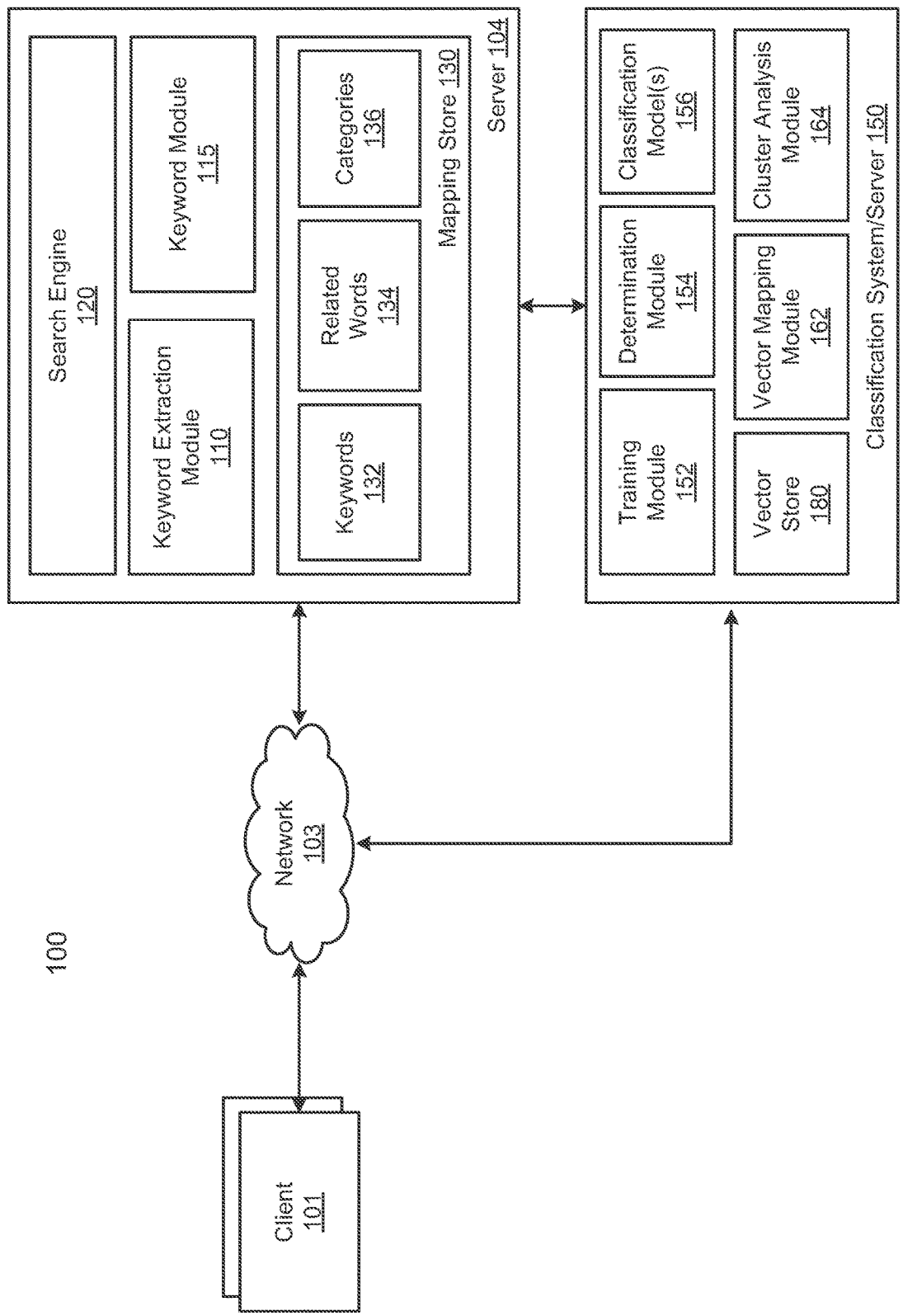
FIG. 1 is a block diagram illustrating an example system configuration according to some embodiments of the disclosure.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, described is a technique for associating keywords used in a search query with categories. This technique aims to produce potentially more relevant search results by improving the associations with keywords. Typically, a search using keywords would provide search results related to a content provider. Content providers, however, often associate keywords to an all-embracing organization, service or product. The content provider, however, may be associated with related entities such as sub-organizations, departments, or other related services or products. As a result, searches by a user that include these keywords may often result in search results that list the more general entity itself despite the fact that a related entity may be the most relevant. In other words, keywords selected by a content provider do not always provide the most relevant search results. For instance, in a healthcare related context, when a user searches for a particular eye disorder, a typical search might often provide results related to a local hospital associated with certain keywords, when in fact, a specific ophthalmology department of the hospital would be a more relevant search result.

Accordingly, in an effort to potentially produce more relevant search results, embodiments described herein associate keywords by using a machine learning technique. More specifically, some embodiments describe training a classification model, and in addition, utilizing the classification model to select categories that may be associated with a content provider. For example, an embodiment describes a classification model that is trained to receive as input a set of keywords that the model converts into word vectors. These word vectors may then be mapped to a vector space and the technique may then perform a cluster analysis of the vectors. Based on the cluster analysis, a cluster nearest the keyword vector may be identified. The identified cluster may be associated with a corresponding category. These categories may, for example, be associated with entities related to the content provider such as an organization, business unit, department, or other related product or service.

As a result, embodiments described herein may aid in producing more relevant search results and are capable of continuously learning to further improve these results. Moreover, the process is efficient in that a classification model may be periodically trained further in response to newly added keywords or a keyword plan. Accordingly, embodiments to train and utilize such a classification model are discussed further herein.

FIG. 1 is a block diagram illustrating an example system configuration according to some embodiments of the disclosure. In FIG. 1, system 100 may include a client device 101 (one or more) communicatively coupled to server 104 via a network 103. A classification system or server 150 may also be communicatively coupled to the network 103 and server 104. Client device 101 (or client, or device) may be any type of computing device such as a personal computer (e.g. desktop, laptop, and tablet), a "thin" client, a personal digital assistant (PDA), a Web enabled appliance, a Smartwatch, or a mobile phone (e.g. Smartphone), etc. Network 103 may be any type of wired or wireless network such as a local area network (LAN), a wide area network (WAN) such as the Internet, or a combination thereof.

Server 104 may be any kind of server or a cluster of servers and may include a Web or cloud-based server, application server, backend server, or a combination thereof. In one embodiment, server 104 may include a search engine 120, a keyword extraction module 110, a keyword module 115, and a mapping store 130.

Search engine 120, for example, may include a Web search engine that is designed to search for information on the World Wide Web. The search engine 120 may be an existing engine such as a Baidu® search engine available from Baidu, Inc. or alternatively, search engine 120 may represent a Google® search engine, a Microsoft Bing™ search engine, a Yahoo® search engine, or another type of search engine. Search engine 120 may provide a search result (or query result) including a mix of Web pages, images, and other types of files, and may maintain real-time information by running an algorithm (e.g. a web crawler) to maintain an index. For example, when a user enters a query into a search engine (typically by using keywords), the engine examines its index and provides a listing of results. As further described herein, when a query is received, a category associated with a particular keyword may be determined in real-time by the classification model and provided as part of a search result. For example, in response to a query, the search engine 120 may integrate a determined category as part of a search result. In addition, the category may be determined in advance and the index may be updated. For example, in response to a query, the search engine 120 may reference its updated index to determine a category based on a determination process (e.g. determination 500) that has already been conducted for one or more keywords. It should also be noted that search engine 120 may employ various techniques to provide search results, and embodiments herein may be combined with these techniques to provide search results.

Search engine 120 may perform a search in a content database (not shown), such as a primary content database and/or an auxiliary content database, to generate a list of content items. Each of the content items may be associated with a particular Web page of a particular Web site of a particular content provider via a uniform resource link (URL) and/or a uniform resource identifier (URI). In one embodiment, the primary content database stores general content items that have been collected by network crawlers (e.g., unsponsored content). The auxiliary content database stores specific or special content items that are associated with specific, known, or predetermined content providers (e.g., sponsored content). Alternatively, a content database may be implemented as a single database without distinguishing a primary content database from an auxiliary content database. A content database may be maintained in a separate server, e.g., a content server.

Mapping store 130 may include any suitable type of storage as described herein and may include keywords 132, related words 134, and categories 136. Keywords 132 may include words or terms used by the search engine 120 and may include words or terms associated with a content provider. For example, as described above, content providers may bid on various words or terms as keywords 132 that may be part of keyword plan offered by a search provider. Although keywords 132 in this disclosure are described with reference to a single word or term, it should be understood that keywords 132 may also include phrases or sentences that may be in one or more languages.

As further described herein, related words 134 include words used during the training process (or training phase) of the classification model 156. The related words may include a unique set of words related to a group of keywords, for example, that are associated with a keyword plan. Based on training the classification model 156 with the related words 134, categories 136 that are associated with keywords 132 may be determined. In some embodiments, categories 136 may correspond to entities related to a content provider. It should be noted that the term entity as used herein is defined broadly and may include any organization (or sub-organization), department, business unit, group, association, or other related product or service, unit, object, or item that may be associated with a content provider.

A keyword module 115 may manage keywords 132 and associations between content providers and keywords 132. As further described herein, the keyword module 115 may also determine the related 134 as described above. As further described herein, a keyword extraction module 110 may extract relevant keywords from a search query (or query) received from a client.

Server 104 may further include an interface (not shown) to allow devices (e.g. client device 101, or classification system 150) to access resources or services provided by server 104. The interface may include a Web interface, an application programming interface (API), and/or a command line interface (CLI).

Classification system 150 may be a standalone device (e.g. server) as shown, or may be part of server 104, which as described above may be part of a cluster of servers. In one embodiment, classification system 150 may include a training module 152, a determination module 154, and a classification model 156. As further described herein, the training module 152 may train the classification model 156. For example, the training module 152 may provide input (e.g. a training set of data) in order to train the classification model 156. The training module 152, may also pre-train the classification module 156 using various forms of structured input. For example, training module 152 may provide as input various training documents known in the art, including open source tools. As further described herein, the determination module 154 may determine a category associated with a keyword based on output from the classification model 156.

The classification model 156 may utilize a langue modelling technique. For example, the classification model may employ language modeling or feature learning techniques such as a word embedding technique that relates to a natural language processing where words or phrases from a vocabulary are mapped to vectors of real numbers in a low-dimensional space relative to the vocabulary size. For example, in one embodiment, the classification model employs a Word2vec model in order to convert the words into words vectors. Generally, a Word2vec model may implement a neural network that learns distributed representations for words. Word2vec may create meaningful representations create vectors with useful characteristics. For example, words with similar meanings may appear in clusters when mapped to a vector space. In addition, clusters are spaced such that some word relationships, such as analogies, can be reproduced using vector math. For instance, the most notable example is that, with sufficiently trained word vectors, "king−man+woman=queen." It should be noted that in addition to Word2vec, other word embedding techniques may also be utilized such as "GloVe," "Deeplearning4j," or other suitable technique.

Once the classification model creates word vectors, the vectors and related information may be stored in a vector store 180. In order to process the created word vectors, a vector mapping module 162 may be utilized to map the vectors onto a vector space. It should be noted that although a "vector mapping" is shown as a visual mapping, implementations of embodiments do not necessarily have to map vectors in this manner. For example, the cluster analysis module 164 may analyze the vectors directly as they are already in the form of numeric representations.

A cluster analysis module 164 may analyze the vectors to identify clusters of vectors. As further described herein, these clusters may be identified and a corresponding category may be identified during the training process. As a result, during a determining process (or prediction phase), the cluster analysis module 164 may determine a cluster nearest to a keyword vector to determine a corresponding category associated with a keyword.

The cluster analysis module 164 may employ any suitable algorithm for the analysis. For example, a cluster analysis algorithm may involve identifying clusters based on groups with small distances among the cluster members, dense areas of the data space, intervals, particular statistical distributions, or other technique. Accordingly, embodiments may include various clustering algorithms and various parameter settings including a distance function, a density threshold, or the number of expected clusters. In one embodiment, a hierarchical clustering based on, for example, a distance connectivity may be used. In addition, a centroid model, based on, for example, a k-means algorithm representing each cluster by a mean vector may be used. Other suitable models may also be used such as distribution models (e.g. clusters are modeled using statistical distributions), density models (e.g. defining clusters as connected dense regions in the data space), subspace models (e.g. bi-clustering or co-clustering or two-mode-clustering), group models, and graph-based models. It should be noted that a combination of these models may be used and the same or different techniques may be used during a cluster analysis for the training process and determining process as further discussed herein.

With respect to the system configuration of FIG. 1, other architectures or configurations may also be applicable. For example, mapping store 130 or vector store 180 may be maintained and hosted in a separate server as a content server over a network. Such a content server or additional servers may be organized and provided by the same provider or organization as of server 104. Alternatively, such a content server or additional servers may be maintained or hosted by separate providers or organizations (e.g., third-party providers), which are responsible for managing content in content databases.

The block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

Figure 2:
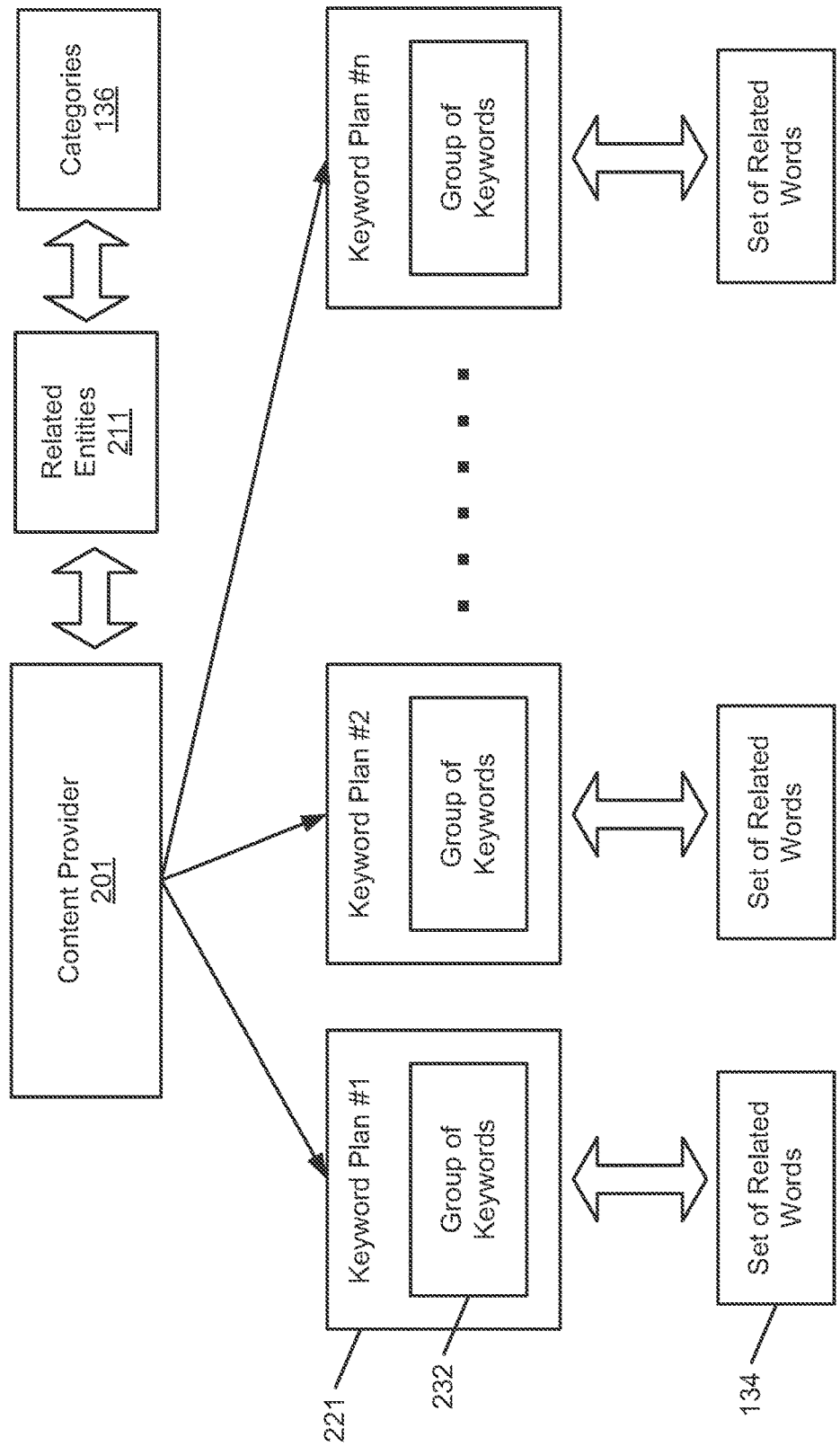
FIG. 2 is a diagram illustrating an example overview of associations between a content provider, keywords, and categories according to an embodiment of the disclosure.

FIG. 2 is a diagram illustrating an example overview of associations between a content provider, keywords, and categories according to an embodiment of the disclosure. In this example, a content provider 201 may be associated to one or more keyword plans 221. For example, a content provider 201 may subscribe to a keyword plan including one or more keywords related to the healthcare field. For instance, these keywords may include terms that are related to the content provider's organization, products, or services. Each keyword plan 221 may include one or more keywords (e.g. keywords 132) that form part of a group of keywords 232. Alternatively, a content provider 201 may be directly associated with a group of keywords 232. In order to train the classification model (e.g. classification model 156), a set of related words 134 may be associated with each group of keywords 232 and/or each keyword plan 221. As described further herein, each set of related words 134 may be used to create word vectors during the training of the classification model. In addition, the set of related words 134 may be a unique set of words, which may include each word being unique to the associated group of keywords, or the set of words being unique as a group.

In addition, as described above, a content provider 201 may also be associated with one or more related entities 211 such as organizations, departments, or other related services or products. In some embodiments, each of these related entities 211 may be associated with or correspond to one of the categories 136. These categories 136 may also include predetermined categories. These categories may be predetermined in any suitable manner. For example, a content provider may define a set of related entities 211 as part of an account with a search provider. In addition, the search engine 120 (or server 104) may predetermine the categories. For example, the search engine 120 may employ techniques used as part of a search algorithm to find related entities (e.g. based on related content, websites, etc.). For instance, the search engine 120 may determine the related entities from a domain name analysis (e.g. related entities may share or have similar domain names), an analysis of related content (e.g. website), or other suitable technique.

In some embodiments, when the classification model determines a category based on a keyword, a related entity 211 of the content provider 201 may also be determined as part of a search result. By way of a non-limiting example, a content provider 201 may subscribe to a keyword plan related to a medical ailment. Accordingly, the set of related words may include related medical terms, or terms describing specific symptoms that are unique to the keyword plan (or group of keywords). The determined set of words may then be used to train the classification model. Accordingly, during a subsequent search that includes one or more of the keywords (e.g. a term for the specific ailment), the classification model may determine a category as part of the search result. This category may be associated with or correspond to the related entity such as the department of a hospital that treats the specific ailment, which may be used as a more appropriate search result than a result that includes only the hospital (e.g. the content provider) itself.

Figure 3:
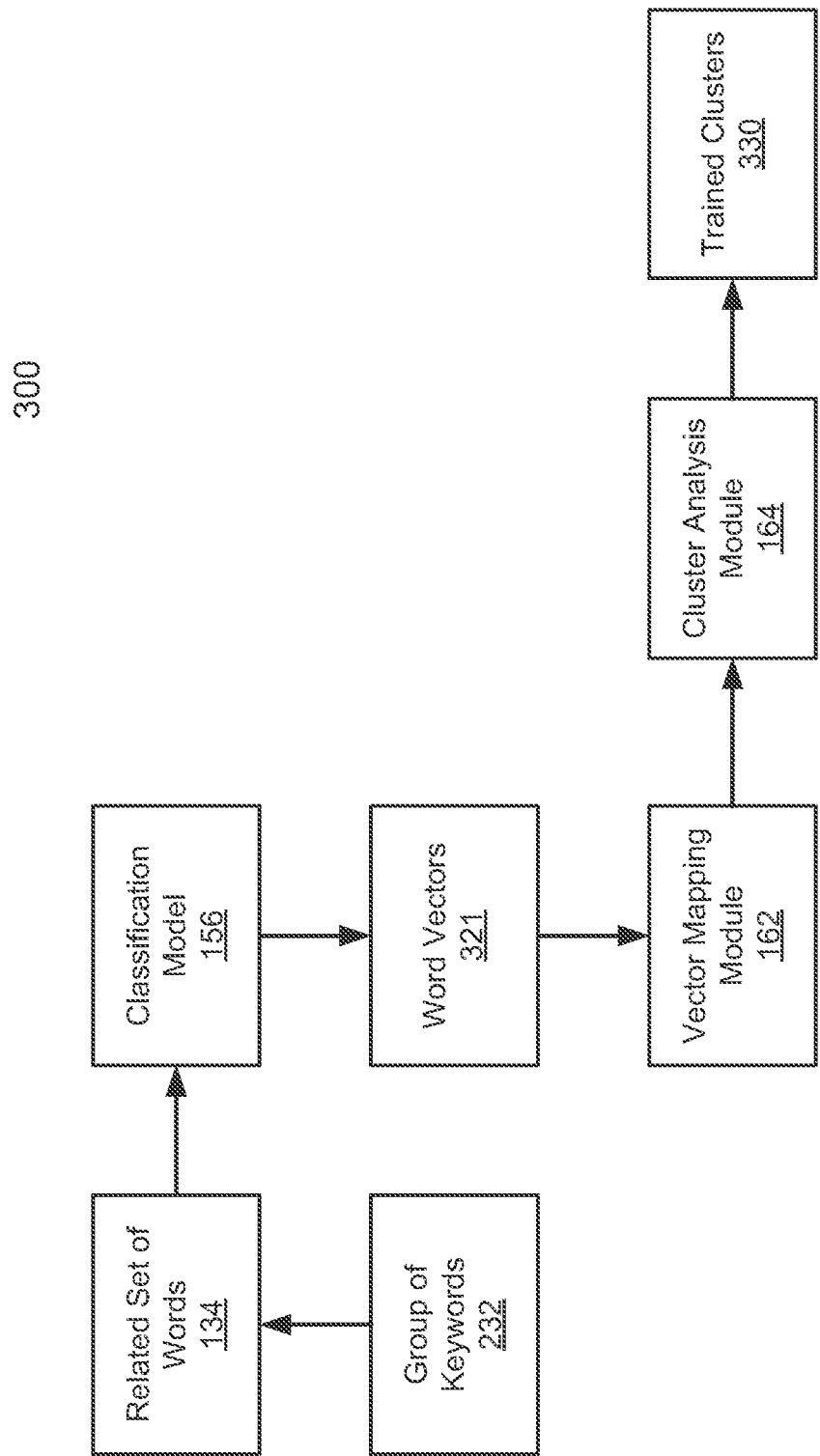
FIG. 3 is a processing flow diagram illustrating an example of conducting a training process using a classification model according to an embodiment of the disclosure.

FIG. 3 is a processing flow diagram illustrating an example of conducting a training process using a classification model according to an embodiment of the disclosure. In an effort potentially improve search results, a training module 152 may perform a training process 300. In some embodiments, the training module 152 may initiate the training process 300 as a way to initialize the classification model 156, and may also train the classification model 156 periodically (e.g. daily, weekly), or upon a specific event. For example, a specific event may include the addition of a new content provider 201, or when a new keyword plan 221 or group of keywords 232 is created.

As described above, a content provider may be associated with a group of keywords (e.g. group of keywords 232). For example, a content provider may bid on certain keywords as part of a keyword plan (e.g. keyword plan 221) offered by a search provider. As part of the training process 300, or as part of an independent process, a related set of words 134, may be determined by, for example, the keyword module 115 using various techniques. In one embodiment, the related set of words 134, may be a set of words that are unique to a particular keyword plan or group of keywords. In addition, in one embodiment, the keyword module 115 may determine the related set of words 134 based on a relevancy, which may be determined using various techniques. For example, one technique may include determining the frequency of words that are associated with a keyword plan or a group of keywords. For instance, in one embodiment, a term-frequency-inverse document frequency (TF-IDF) statistic may be used to determine the related set of words 134. This statistic, for example, reflects how important a word is to a document based on a weighting that increases proportionally to the number of times the word appears in a document, but is offset by the frequency of the word in the corpus, which accounts for some words appearing more frequently in general.

Next, the related set of words 134, which may be a unique set of words, may be used as training data for the classification model 156. Accordingly, the determined related set of words 134 are provided as input for the classification model 156. As described above, the classification model 156 may employ various language modeling techniques, including a word embedding model, to create word vectors 321. The size of the word vectors 321 may be adapted according to the application, and may include hundreds of dimensions. Word vectors 321 may also include sets of vectors organized in any suitable manner including a matrix. As the word vectors 321 are now represented in numerical form, a mathematical analysis may be conducted.

Figure 4:
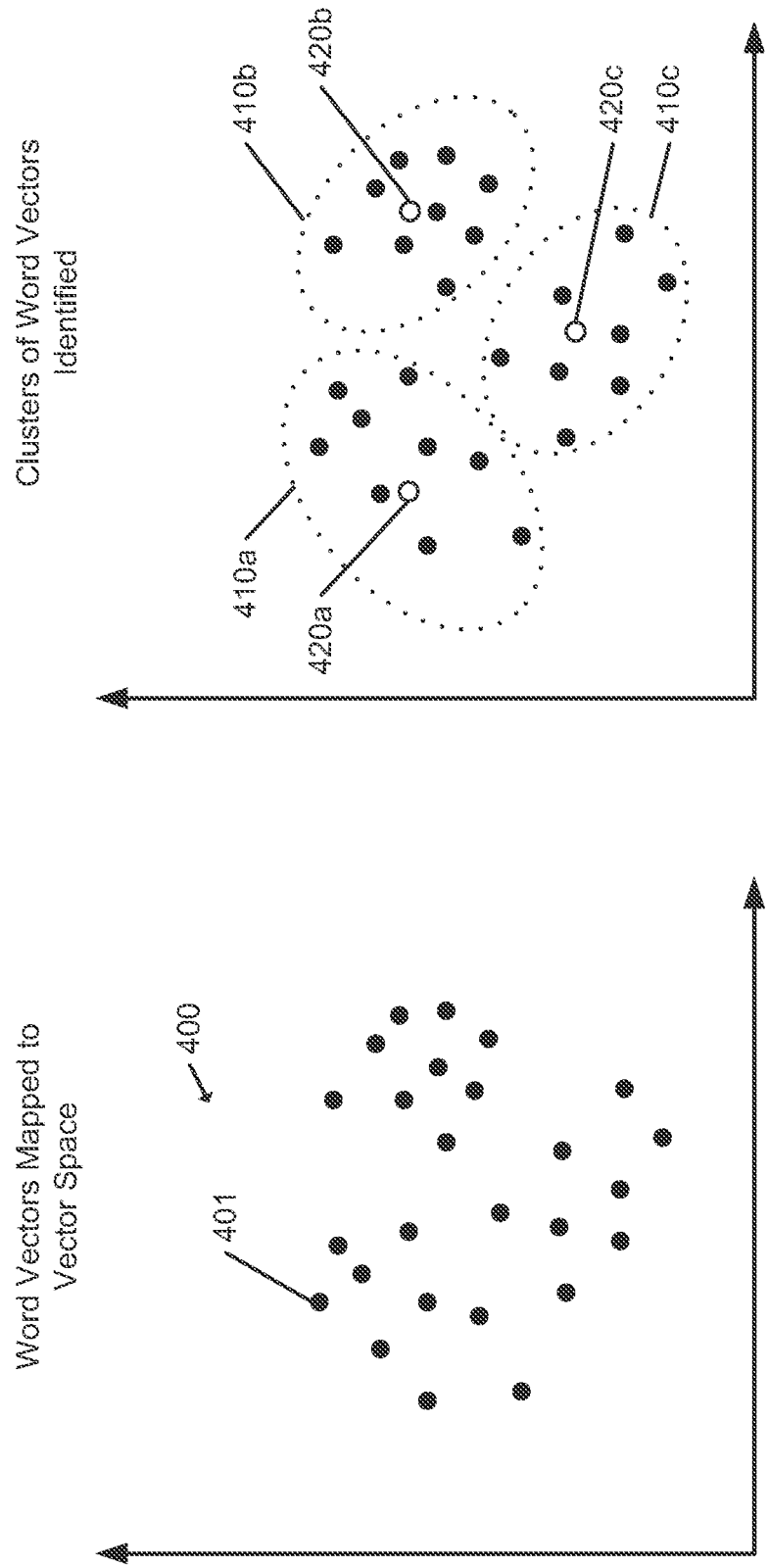
FIG. 4A is a diagram illustrating an example mapping of word vectors to a vector space during a training of the classification model according to an embodiment of the disclosure.
FIG. 4B is a diagram illustrating an example of identifying clusters of the word vectors as shown in FIG. 4A according to an embodiment of the disclosure.

Once the word vectors 321 are created, a vector mapping module 162 may map the word vectors 321 to a vector space as shown, for example, in FIG. 4A. FIG. 4A is a diagram illustrating an example mapping of word vectors to a vector space during a training of the classification model according to an embodiment of the disclosure. As shown, word vectors may be mapped as points 401 within a vector space 400. It should be noted that FIG. 4A is for illustration purposes only, and the vector space may be any number of n dimensions.

Referring back to FIG. 3, vector mapping module 162 may perform any number of functions, operations, or calculations on the word vectors 321. For example, word vectors may be added or subtracted to form new points within the vector space 400.

Cluster analysis module 164 may utilize any of the clustering techniques described herein to identify clusters. For example, in one embodiment, the cluster analysis module 164 may employ a hierarchical clustering technique. Accordingly, the cluster analysis module 164 may identify word vectors that are within a threshold distance of each other in the vector space, for example, as shown in FIG. 4B. FIG. 4B is a diagram illustrating an example of identifying clusters of the word vectors as shown in FIG. 4A according to an embodiment of the disclosure. As shown in this example, three clusters 410a-c are identified. Once the clusters have been identified, the cluster analysis module 164 may associate each of the clusters with one of the categories (e.g. categories 136). For example, each cluster may be labelled with the closest corresponding category. In one embodiment, and as shown in the example of FIG. 4B, the centroid of each cluster (e.g. centroids 420a-c) may be labelled with a corresponding category.

Returning back to FIG. 3, as a result of the training process 300, "trained" clusters are created. These trained clusters 330 may now be used in a determining process (or prediction phase).

Figure 5:
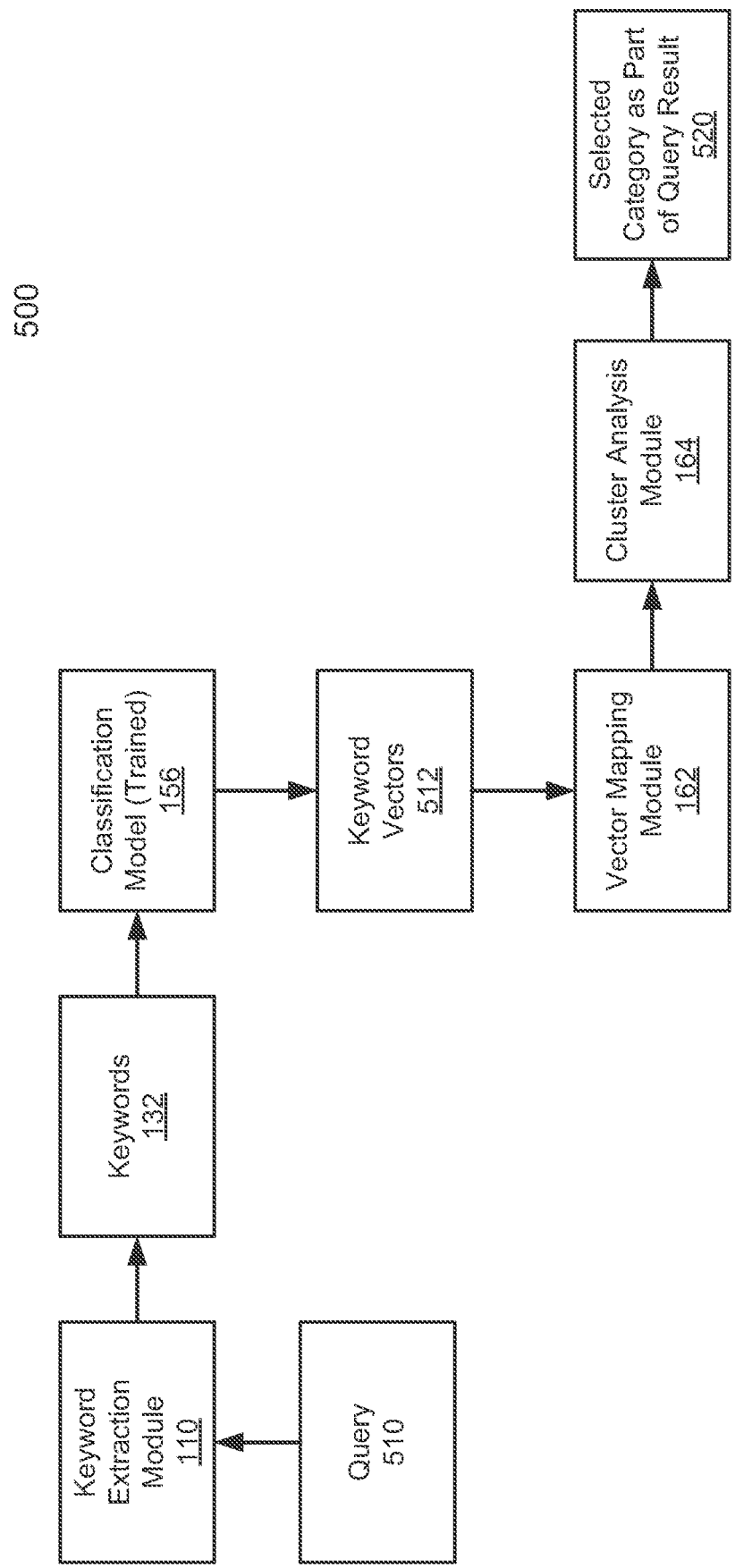
FIG. 5 is a processing flow diagram illustrating an example of conducting a determining process using a classification model according to an embodiment of the disclosure.

FIG. 5 is a processing flow diagram illustrating an example of conducting a determining process using a classification model according to an embodiment of the disclosure. Once the classification model 156 is trained, a predetermined category associated with a keyword may be determined (e.g. "predicted") with a determining process 500. In one embodiment, the determination module 154 may perform the determining process 500. In an embodiment, a query 510 may be received by the server 104 (or search engine 120). Accordingly, a keyword extraction module 110 may process the query and extract keywords 132. The query 510 may include a search string with one or more words or terms. For example, the keyword extraction module 110 may identify relevant keywords 132 and discard the irrelevant terms (e.g. "the," "a," etc.) from the search string. In another example, keyword extraction module 110 may discard geographically-related words and terms from the search string as "noise." In addition, the keyword extraction module 512 may process character strings from various languages. For example, some symbol based languages may have various character sets. It should be noted that the embodiments are not limited to the English language and the techniques described herein are equally applicable to other languages as well, including symbol or syllable based languages such as, for example, Cantonese. Moreover, because the classification model 156 converts the keywords into vectors, e.g. numeric representations, the disclosure herein may be adapted for any suitable language.

Once keywords 132 have been isolated, they may be inputted into the classification model 156, which is now trained from the training process 300. As described above, the trained classification model 156 may output keyword vectors 512 using a language modelling technique. Once the keyword vectors 512 are created, the vector mapping module 162 may map the keyword vectors 512 to the same vector space used in the training process 300 as shown, for example, in FIG. 6A.

FIG. 6A is a diagram illustrating an example mapping of a keyword vector amongst word vectors of the classification model according to an embodiment of the disclosure. As shown in this example, a keyword vector 601 may be mapped amongst the word vectors mapped during a training process (e.g. training process 300). Referring back to FIG. 5, vector mapping module 162 may perform any number of functions, operations, or calculations on the keyword vectors 512. Cluster analysis module 164 may determine the appropriate category associated with the keyword vector 601. When determining the nearest cluster, various techniques may be used. For example, a k-Nearest Neighbors algorithm (or k-NN) may be utilized. In one embodiment, the cluster analysis module 164 may determine the nearest cluster based on the distance from the centroid of the nearest cluster to the mapped keyword vector, as shown, for example, in FIG. 6B.

FIG. 6B is a diagram illustrating an example of determining a nearest cluster to the mapped keyword vector as shown in FIG. 6A according to an embodiment of the disclosure. As shown in this example, a distance 611 may be determined from keyword vector 601 to centroid 420c. Accordingly, it may be determined that centroid 420c is the closest centroid, and thus, cluster 410c is the nearest cluster. The cluster analysis module 164 may then select the category corresponding to cluster 410c as the category associated with the keyword. Returning the FIG. 5, the selected category may then be returned as part of the query result 520.

Figure 7:
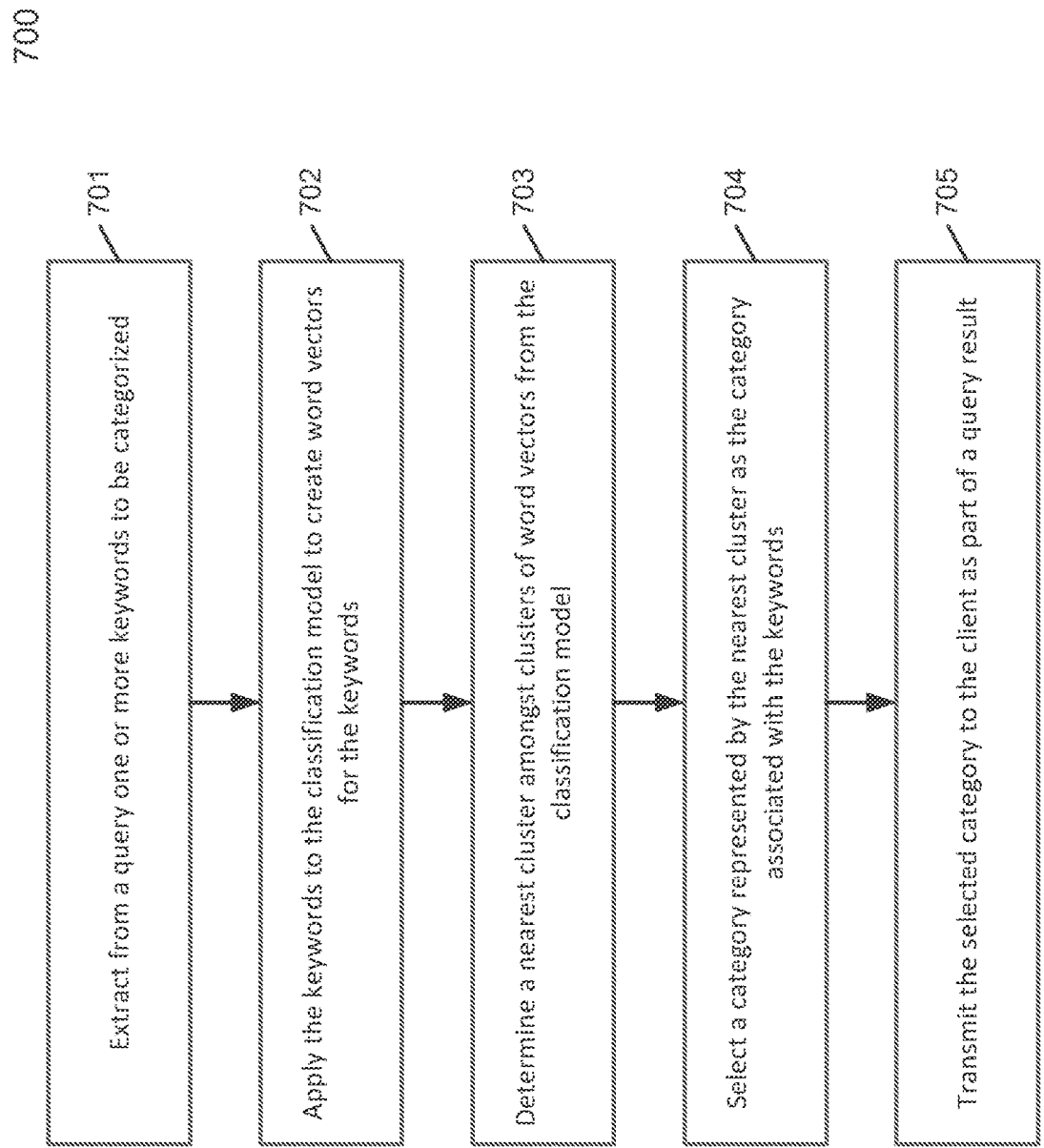
FIG. 7 is a flow diagram illustrating a method of categorizing keywords according to an embodiment of the disclosure.

FIG. 7 is a flow diagram illustrating a method of categorizing keywords according to an embodiment of the disclosure. Process 700 may use processing logic which may include software, hardware, or a combination thereof. For example, process 700 may be performed by a computing device or device (e.g. server 104). In block 701, a device may extract, from a query received from a client, one or more keywords (e.g. keywords 132) to be categorized as one of a plurality of predetermined categories (e.g. categories 136). The device may use a classification model (e.g. classification model 156) to determine a category associated with the keywords. Accordingly, in block 702, the device may apply the keywords to the classification model to create keyword vectors (e.g. keywords vectors 512). In one embodiment, the classification model may be based on a word embedding model to create the keyword vectors. For example, the word embedding model may be based on a Word2vec model. The architecture of the Word2vec model may also be catered to the specific application. For example, the Word2vec model may apply either a skip-gram or a continuous bag of words (CBOW) process to create the word vectors.

In block 703, the device may determine, amongst clusters of word vectors from the classification model, a nearest cluster based on a distance from a centroid of the nearest cluster to a position of the word vectors for the keywords. In an embodiment, the centroid of each cluster corresponds to one of the predetermined categories. In block 704, the device may select a category represented by the nearest cluster as the category associated with the keywords. In block 705, the device may transmit the selected category to the client as part of a query result.

In one embodiment, each of the predetermined categories may be associated with a medical data segment (e.g. a related entity as an item), and each medical data segment may be associated with one of the medical departments of a medical organization. For example, the predetermined categories may be associated with medical ailments and the medical departments may be the appropriate medical department that treats each of the medical ailments.

Figure 8:
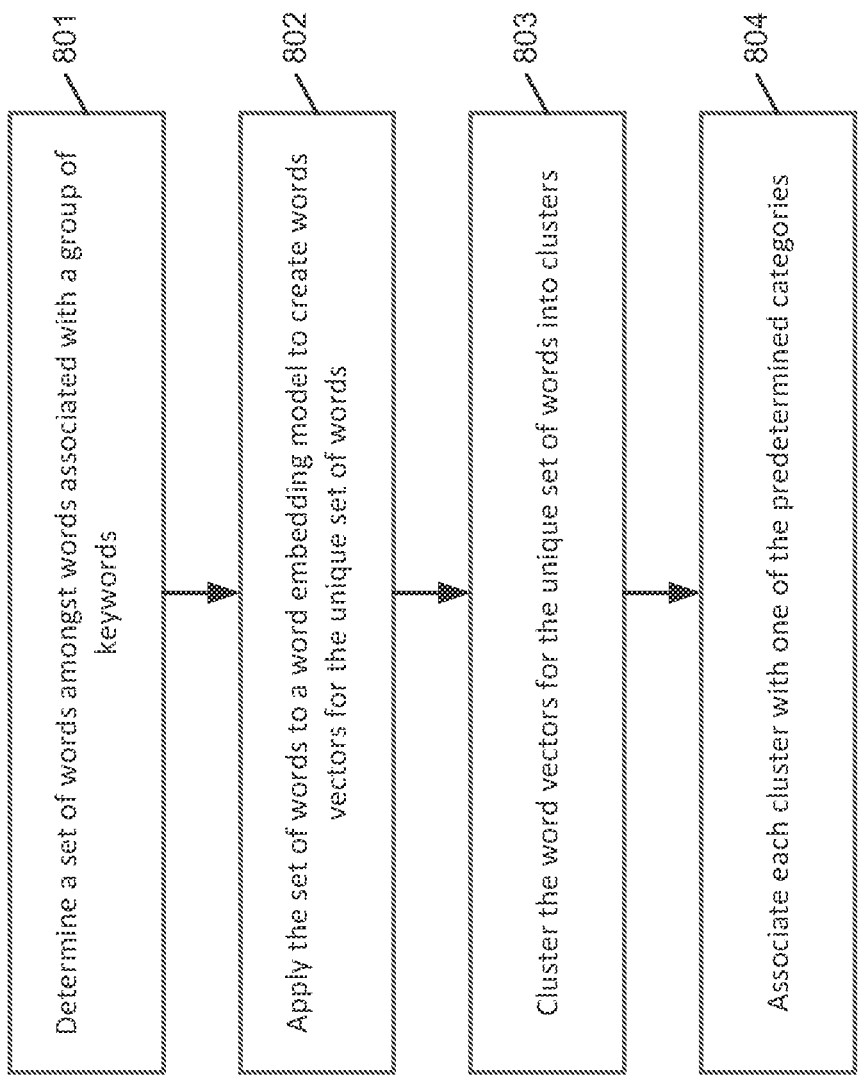
FIG. 8 is a flow diagram illustrating a method of generating a model for categorizing keywords according to an embodiment of the disclosure.

FIG. 8 is a flow diagram illustrating a method of generating a model for categorizing keywords according to an embodiment of the disclosure. Process 800 may use processing logic which may include software, hardware, or a combination thereof. For example, process 800 may be performed by a computing device or device (e.g. classification system 150, or server 104). In block 801, a device may determine a set of words (e.g. related words 134) amongst words associated with a group of keywords (e.g. group of keywords 232). In one embodiment, the set of words may be a unique set of words that are determined based on a frequency of the words in the set by determining a term frequency-inverse document frequency (TF-IDF) statistic amongst the words associated with the group of keywords.

In block 802, the device may apply the set of words to a word embedding model to create words vectors for the set of words. In one embodiment, the device may periodically train (e.g. update) the word embedding model in response to, for example, a new group of keywords being associated with a content provider. In addition, the word embedding model may be additionally trained by manually mapping a set of words to at least one of the predefined categories. In block 803, the device may cluster the word vectors for the set of words into clusters. In one embodiment, the clustering may include hierarchically clustering the word vectors for the set of words. In block 804, the device may associate each cluster with one of the predetermined categories. For example, in one embodiment the device may label a centroid of each cluster with one of the predetermined categories. In one embodiment, this labelling (or mapping) may be performed manually. In one embodiment, the group of keywords may be associated with a content provider, and each of the predetermined categories may correspond to at least one of a department of the content provider, a related entity of the content provider, products offered by the content provider, or services offered by the content provider.

In one embodiment, the techniques described above can also be applied to tracking online advertisement or Ads interactions and conversions of the Ads (e.g., offline conversions). In a typical search advertising scenario, an advertiser (also referred to as an Ads provider) buys keywords with a search engine of an advertising company and sets up advertisements targeting these keywords. When a user's search query matches one or more of the bought keywords, corresponding Ads may be shown along with organic search results in the result page. The advertiser may be charged based on how many times their advertisements are shown or clicked on. Alternatively they may be charged based on how many conversions occurred as the result of advertising. Conversions can be either online (such as users visiting the advertiser's website and placing an order) or offline (such as users visiting the advertiser's brick-and-mortar store). Conversion rate is a key metric to evaluate the effectiveness of advertisements, so an advertiser is usually very interesting in finding out which advertisements lead to conversions.

Accordingly, an Ads provider may bid on one or more keywords that may be part of, for example, an Ads plan, online marketing plan, or keyword plan offered by a search provider. In some situations, a content provider may just bid a set of words for the entire organization (e.g., medical facility or hospital). However, some of the words may be associated with a specific sub-units or departments of the organization. The classification models described above can be utilized to determine whether a particular Ads is associated with a particular sub-unit or department of an organization.

Figure 9:
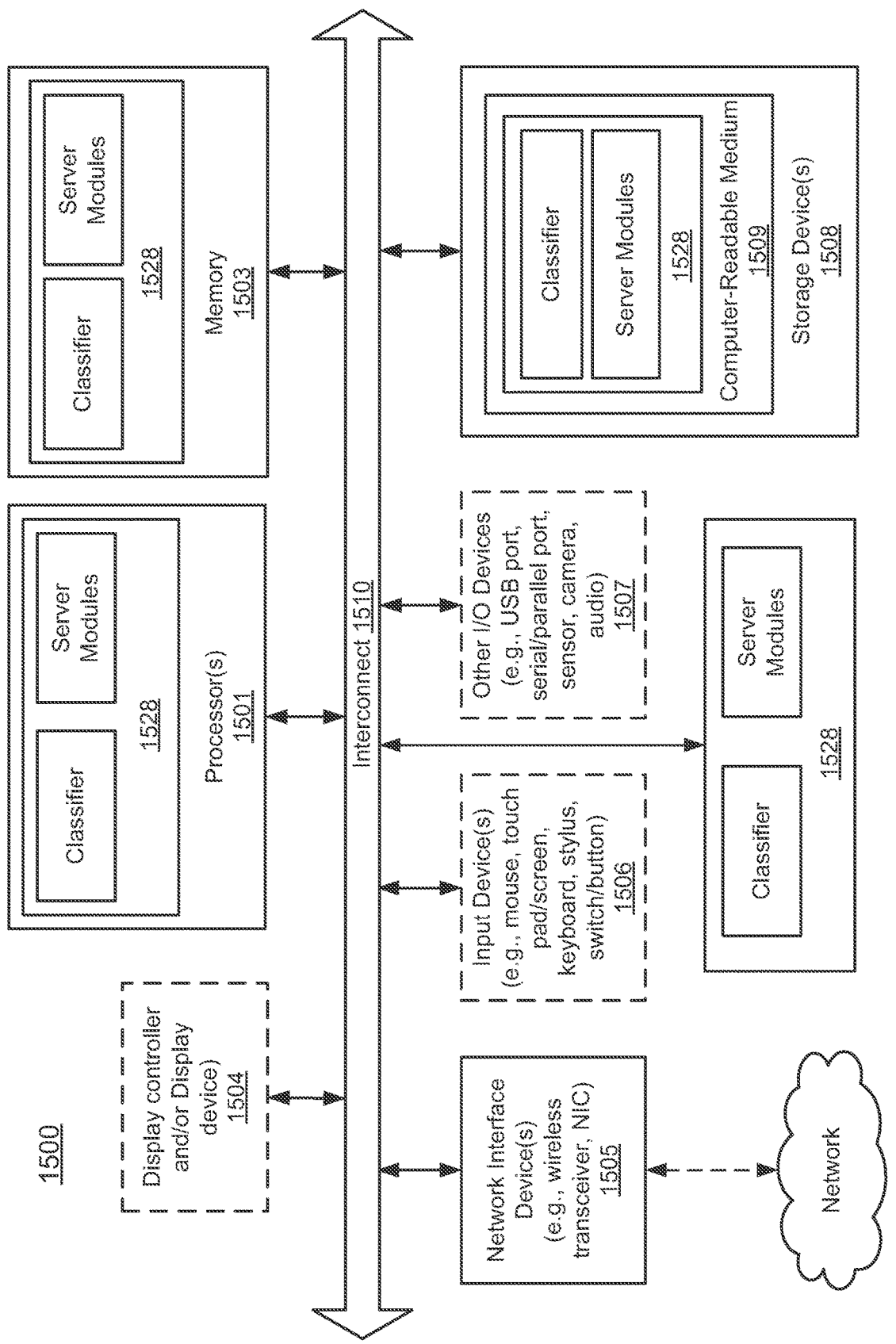
FIG. 9 is a block diagram illustrating an example computing device according to an embodiment of the disclosure.

FIG. 9 is a block diagram illustrating an example computing system according to an embodiment of the disclosure. For example, system 1500 may represents any of data processing systems described above performing any of the processes or methods described above, such as, for example, server 104 or client 101 described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein.

Module/unit/logic 1528 may represent any of the components described above, such as, for example, a search engine, a server modules (e.g. keywords extraction module 110, keyword module 115), as well the classification system 150, classification model 150, and classifier modules (e.g. training module 152, determination module 154, vector mapping module 162, and cluster analysis module 164) as described above. Module/unit/logic 1528 may also reside, completely or at least partially, within memory 1503 and/or within processor 1501 during execution thereof by data processing system 1500, memory 1503 and processor 1501 also constituting machine-accessible storage media. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A computer-implemented method for categorizing keywords, the method comprising:
   extracting, by one or more processors for a keyword extraction module, one or more keywords from a query received from a client, the one or more keywords to be categorized as one of a plurality of predetermined categories of word vectors;
   determining, by the one or more processors, a category associated with the keywords using a classification model, wherein the classification model includes a neural network model, including
      applying the keywords to the classification model to create at least one keyword vector,
      determining, amongst a plurality of clusters of word vectors associated with the classification model, a nearest cluster based on a distance from a centroid of the nearest cluster to a position of the at least one keyword vector, wherein the centroid of each cluster corresponds to one of the predetermined categories of word vectors, wherein the classification model is periodically trained in response to newly added keywords or a keyword plan, wherein a first of the predetermined categories is associated with a first entity and a second of the predetermined categories is associated with a second entity, and
      selecting a category represented by the nearest cluster as the category associated with the keywords; and
   transmitting, by the one or more processors, the selected category to the client as part of a query result, and wherein the classification model is trained by
      determining a set of words amongst words associated with a group of keywords;
      applying the classification model to convert the set of words into word vectors;
      clustering, using hierarchical clustering, the word vectors into clusters; and
      labelling the centroid of each cluster with a corresponding one of the predetermined categories.

2. The method of claim 1, wherein each of the predetermined categories is associated with one of a plurality of medical data segments, and each medical data segment is associated with one of a plurality of medical departments of a medical organization.

3. The method of claim 1, wherein the set of words is a unique set of words unique to the associated group of keywords.

4. The method of claim 3, wherein the unique set of words is determined based on a frequency of the words in the set by determining a term frequency-inverse document frequency (TF-IDF) statistic amongst the words associated with the group of keywords.

5. The method of claim 1, wherein the classification model is based on a word embedding model to create the word vectors.

6. The method of claim 5, wherein the word embedding model is based on a Word2vec model that applies either a skip-gram or a continuous bag of words (CBOW) process to create the word vectors.

7. A non-transitory machine-readable medium having instructions stored therein, which when executed by a processor, cause the processor to perform operations for categorizing keywords, the operations comprising:
   extracting, by one or more processors for a keyword extraction module, one or more keywords from a query received from a client, the one or more keywords to be categorized as one of a plurality of predetermined categories of word vectors;
   using a classification model, determining, by the one or more processors, a category associated with the keywords, wherein the classification model includes a neural network model, including
      applying the keywords to the classification model to create at least one keyword vector,
      determining, amongst a plurality of clusters of word vectors associated with the classification model, a nearest cluster based on a distance from a centroid of the nearest cluster to a position of the at least one keyword vector, wherein the centroid of each cluster corresponds to one of the predetermined categories of word vectors, wherein the classification model is periodically trained in response to newly added keywords or a keyword plan, wherein a first of the predetermined categories is associated with a first entity and a second of the predetermined categories is associated with a second entity, and
      selecting a category represented by the nearest cluster as the category associated with the keywords; and
   transmitting, by the one or more processors, the selected category to the client as part of a query result, wherein the classification model is trained by
      determining a set of words amongst words associated with a group of keywords;
      applying the classification model to convert the set of words into word vectors;
      clustering, using hierarchical clustering, the word vectors into clusters; and
      labelling each cluster with a corresponding one of the predetermined categories.

8. The machine-readable medium of claim 7, wherein each of the predetermined categories is associated with one of a plurality of medical data segments, and each medical data segment is associated with one of a plurality of medical departments of a medical organization.

9. The machine-readable medium of claim 7, wherein the labelling comprises mapping a centroid of each cluster with the corresponding one of the predetermined categories.

10. The machine-readable medium of claim 7, wherein the set of words is a unique set of words unique to the group of keywords, and the unique set of words is determined based on a frequency of the words in the set by determining a term frequency-inverse document frequency (TF-IDF) statistic amongst the words associated with the group of keywords.

11. The machine-readable medium of claim 7, wherein the classification model is based on a word embedding model to create the word vectors.

12. The machine-readable medium of claim 11, wherein the word embedding model is based on a Word2vec model that applies either a skip-gram or a continuous bag of words (CBOW) process to create the word vectors.

13. A processing system, comprising:
one or more processors;
a memory coupled to the one or more processors;
an extraction module loaded in the memory and executed by the one or more processors to extract one or more keywords from a query, the one or more keywords to be categorized as one of a plurality of predetermined categories of word vectors; and
a determination module loaded in the memory and executed by the one or more processors to use a classification model to determine a category associated with the keywords, wherein the classification model includes a neural network model, by
applying the keywords to the classification model to create at least one keyword vector,
determining, amongst a plurality of clusters of word vectors associated with the classification model, a nearest cluster based on a distance from a centroid of the nearest cluster to a position of the at least one keyword vector, wherein the centroid of each cluster corresponds to one of the predetermined categories of word vectors, wherein the classification model is periodically trained in response to newly added keywords or a keyword plan, wherein a first of the predetermined categories is associated with a first entity and a second of the predetermined categories is associated with a second entity, and
selecting a category represented by the nearest cluster as the category associated with the keywords, wherein the classification model is trained by
determining a set of words amongst words associated with a group of keywords,
applying classification model to convert the set of words into word vectors,
clustering, using hierarchical clustering, the word vectors into clusters, and
labelling each cluster with a corresponding one of the predetermined categories.

14. The system of claim 13, wherein each of the predetermined categories is associated with one of a plurality of medical data segments, and each medical data segment is associated with one of a plurality of medical departments of a medical organization.

15. The system of claim 13, wherein the labelling comprises mapping a centroid of each cluster with the corresponding one of the predetermined categories.

16. The system of claim 13, wherein the set of words is a unique set of words unique to the group of keywords, and the unique set of words is determined based on a frequency of the words in the set by determining a term frequency-inverse document frequency (TF-IDF) statistic amongst the words associated with the group of keywords.

17. The system of claim 13, wherein the classification model is based on a word embedding model to create the word vectors.

18. The system of claim 17, wherein the word embedding model is based on a Word2vec model that applies either a skip-gram or a continuous bag of words (CBOW) process to create the word vectors.

* * * * *